US012614385B2

(12) United States Patent
Imran et al.

(10) Patent No.: US 12,614,385 B2
(45) Date of Patent: Apr. 28, 2026

(54) REMOTE SENSING AND SOCIAL SENSING FOR FLOOD MAPPING

(71) Applicant: Qatar Foundation for Education, Science and Community Development, Doha (QA)

(72) Inventors: Muhammad Imran, Doha (QA); Rizwan Sadiq, Doha (QA); Zainab Akhtar, Doha (QA); Ferda Ofli, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 351 days.

(21) Appl. No.: 18/198,070

(22) Filed: May 16, 2023

(65) Prior Publication Data

US 2023/0368524 A1    Nov. 16, 2023

Related U.S. Application Data

(60) Provisional application No. 63/364,775, filed on May 16, 2022.

(51) Int. Cl.
| | |
|---|---|
| *G06V 20/10* | (2022.01) |
| *G06Q 10/40* | (2026.01) |
| *H04N 21/431* | (2011.01) |

(52) U.S. Cl.
CPC ....... *G06V 20/182* (2022.01); *H04N 21/4318* (2013.01); *G06Q 10/40* (2026.01)

(58) Field of Classification Search
CPC ... G06V 20/182; H04N 21/4318; G06Q 50/01
See application file for complete search history.

(56) References Cited

U.S. PATENT DOCUMENTS

| | | | | |
|---|---|---|---|---|
| 11,436,777 | B1 * | 9/2022 | Karli | G06V 20/13 |
| 2019/0316309 | A1 * | 10/2019 | Wani | G06F 3/0484 |
| 2020/0126174 | A1 * | 4/2020 | Halse | G06Q 50/265 |

OTHER PUBLICATIONS

Rosser, et al.; "Rapid flood inundation mapping using social media, remote sensing and topographic data"; Springerlink; Jan. 2017; (18 pages).

(Continued)

*Primary Examiner* — Ming Shui
(74) *Attorney, Agent, or Firm* — K&L Gates LLP

(57) ABSTRACT

Remote sensing and social sensing for flood mapping is provided by identifying where floodwater is present in an image of a location affected by a flooding event; identifying a social media post posted on a social media platform from the location and associated with the flooding event; and overlaying the image with the social media post. In some embodiments, the remote and social sensing includes one or more of: generating a permanent water mask identifying where permanent water is located at the location, and applying the permanent water mask to the image to differentiate the floodwater from permanent water for the location; identifying where the social media post was posted from; and overlaying the image with the social media post includes positioning a photograph included in the social media post for display with the image where a subject of the photograph is located at the location.

14 Claims, 6 Drawing Sheets

(56) References Cited

OTHER PUBLICATIONS

Huang; "Remote Sensing and Social Sensing for Improved Flood Awareness and Exposure Analysis in the Big Data Era"; University of South Carolina; 2020; (169 pages).
Cao, et al.; "Deep learning-based remote and social sensing data fusion for urban region function recognition"; ScienceDirect; vol. 163; May 2020; (9 pages).
Sadiq, et al.; "Integrating remote sensing and social sensing for flood mapping"; ScienceDirect; 2022; (16 pages).
Cervone, et al.; "Using Social Media and Satellite Data for Damage Assessment in Urban Areas During Emergencies"; Springer; 2017 (15 pages).

* cited by examiner

300

310 Collect Social Media Posts

320 Identify Geography of Posts

330 Filter for Relevant Social Media Posts to Flooding Event

340 Remove Duplicates

350 Display on Map

500

510      Identify Water In Image

520      Apply Permanent Water Mask

530      Output Differences as Flood Water

540      Generate Alert to Response Team

Computing Device
600

Processor
610

Memory
620

Operating System
622

Programs
624

Communications Interface
630

To/From Other Devices

REMOTE SENSING AND SOCIAL SENSING FOR FLOOD MAPPING

CROSS-REFERENCES TO RELATED APPLICATIONS

The present disclosure claims priority to U.S. Provisional Patent Application No. 63/364,775 entitled "REMOTE SENSING AND SOCIAL SENSING FOR FLOOD MAPPING" and filed on May 16, 2022, which is incorporated herein by reference in its entirety.

BACKGROUND

Flood events cause substantial damage to infrastructure and disrupt livelihoods. Timely monitoring of flood extent helps authorities identify severe impacts and plan relief operations. Remote sensing through satellite imagery is an effective method to identify flooded areas. However, critical contextual information about the severity of structural damage or urgent needs of affected population cannot be obtained from remote sensing alone.

SUMMARY

The present disclosure generally relates to a system and method for the integration of remote sensing and social sensing data to derive informed flood extent maps that include useful information provided directly from eyewitnesses and affected people. Deep learning models are used to process heterogeneous data obtained from various sources and combine the information into a useful format for analysis, flood warning, flood preparation, and flood recovery. The deep learning models take data from Online Social Networking (OSN) platforms which provide three types of signals when used in combination with satellite images: (i) confirmatory signals from both sources, which puts greater confidence that a specific region is flooded, (ii) complementary signals that provide different contextual information including needs and requests, disaster impact or damage reports and situational information, and (iii) novel signals when both data sources do not overlap and provide unique information.

In light of the present disclosure, and without limiting the scope of the disclosure in any way, in an aspect of the present disclosure, which may be combined with any other aspect listed herein unless specified otherwise, a computing system for integrating remote sensing and social sensing data to derive informed flood extent maps that include useful information provided directly from eyewitnesses and affected people is provided. The computing system includes one or more processors and a memory in communication with the one or more processors that stores instructions. The one or more processors are configured to execute the instructions to perform operations that include: identifying where floodwater is present in an image of a location affected by a flooding event; identifying a social media post posted on a social media platform from the location and associated with the flooding event; and overlaying the image with the social media post.

In some embodiments, identifying where floodwater is present in the image of the location affected by the flooding event further comprising: generating a permanent water mask identifying where permanent water is located at the location; and applying the permanent water mask to the image to differentiate the floodwater from permanent water for the location.

In some embodiments, identifying the social media post posted on the social media platform from the location and associated with the flooding event further comprises identifying where the social media post was posted from based on at least one of: geolocation information included with the social media post; and a geolocation inference based on user location data, user profile description data, and text included in the social media post.

In some embodiments, the social media post includes a photograph of the location, wherein overlaying the image with the social media post includes positioning the photograph for display with the image where a subject of the photograph is located at the location.

In some embodiments, identifying the social media post posted on the social media platform from the location and associated with the flooding event further comprises filtering the social media platform for relevant social media posts, including the social media post, based on keywords and time data included in a corpus of social media posts including the relevant social media posts.

The reader will appreciate the foregoing details, as well as others, upon considering the following detailed description of certain non-limiting embodiments including a system and method for detecting an abusive online content according to the present disclosure.

DETAILED DESCRIPTION

Figure 1:
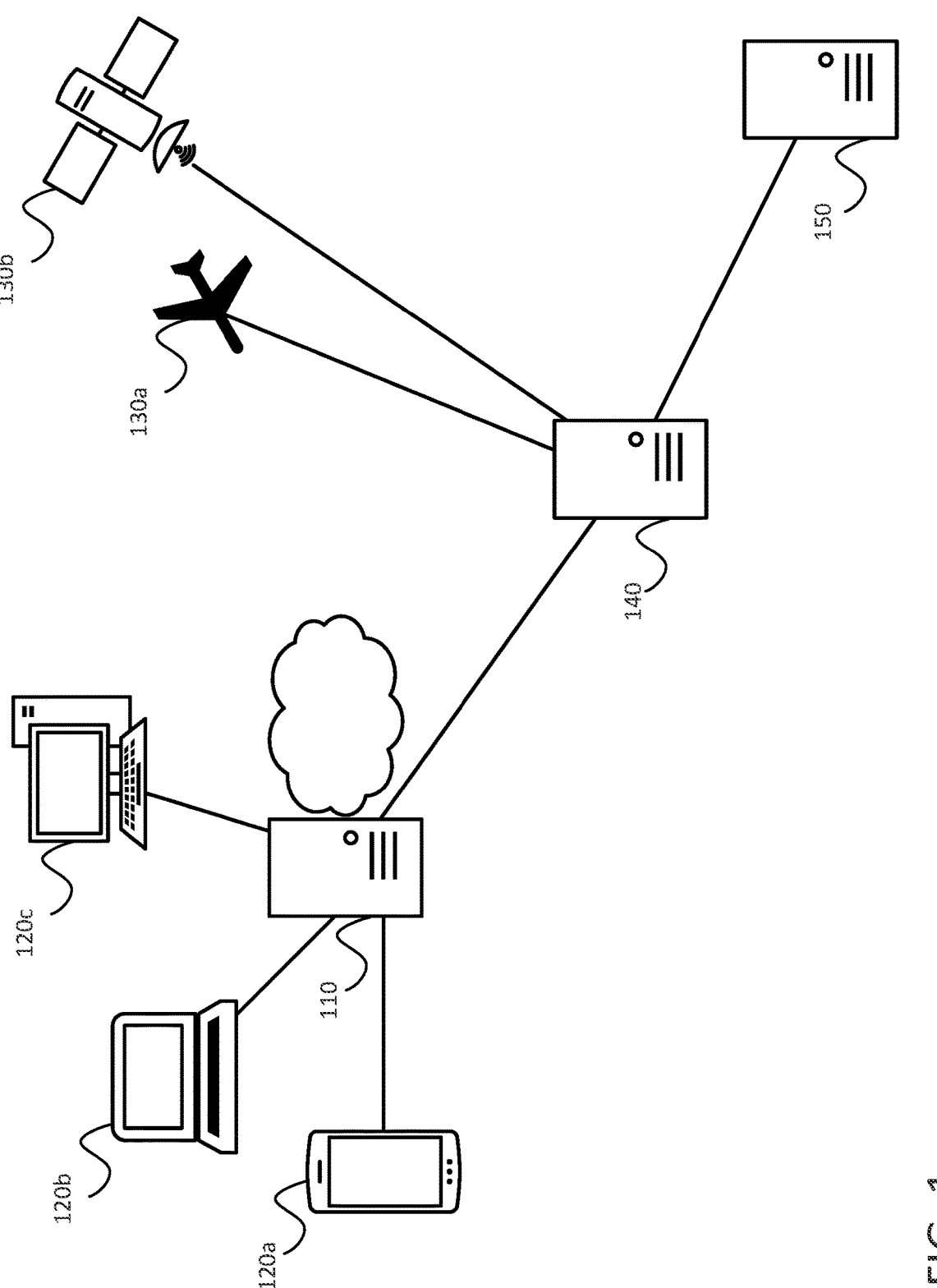
FIG. 1 illustrates an example operational environment in which the present disclosure may be practiced, according to embodiments of the present disclosure.

The present disclosure generally relates to a system, a method, and a computer readable storage device for integrating remote sensing and social sensing data to derive informed flood extent maps that include useful information provided directly from eyewitnesses and affected people. Deep learning models are used to process heterogeneous data obtained from various sources and combine the information into a useful format for analysis, flood warning, flood preparation, and flood recovery. The deep learning models take data from Online Social Networking (OSN) platforms which provide three types of signals when used in combination with satellite images: (i) confirmatory signals from both sources, which puts greater confidence that a specific region is flooded, (ii) complementary signals that provide different contextual information including needs and requests, disaster impact or damage reports and situational information, and (iii) novel signals when both data sources do not overlap and provide unique information.

The present disclosure may be practiced as a method, a computer-readable storage device having instructions that are executable by a processor to perform the method, or a computing system having at least one processor and at least one memory including instructions executable by the processor to perform the method.

In various embodiments, the present disclosure uses a deep learning model pre-trained on flood event datasets to process satellite imagery to determine the location of permanent water and floodwater. The present disclosure augments the satellite imagery with a deep learning model trained on collected social media data related to a specific-event (collected using keywords and hashtags). The model implements a geotagging approach to remove data from social media posts occurring from outside the area of interest, and then processes the relevant social media data through deep learning classifiers and labelers to determine the type of disaster, whether a particular post is informative, and what type of information the post is conveying (e.g., damage reports, water level reports). Duplicate posts are then removed, and the relevant social media data is then overlaid on floodwater segments of a map, produced with input from the remote sensing data, to help enrich humanitarian decision making or other flood monitoring/management uses.

Although machine learning models, especially deep neural networks, can perform well on the dataset they are trained with, these models do not always generalize well to unseen data or other contexts when applied in using live data. The present disclosure therefore provides an improved methodology that segments floodwater from satellite imagery, extracts and classifies text and images related to a flooding event from social media, and fuses the data together in a map layout to provided enriched information for users.

Flood extent mapping is a segmentation task, where the objective is to assign a label (water or land) to each pixel in a given satellite image. The segments assigned with the water label represent all types of water, e.g., permanent water versus floodwater. The permanent water represents lakes, ponds, rivers, and coastal water. Obtaining floodwater segments requires subtracting permanent water segments from all water segments, which can be achieved by applying one or more permanent water masks to obtain floodwater from an image of a location.

In some embodiments, random horizontal and vertical flipping can also applied to the images under analysis. Pixel values can be scaled between 0 and 1 and normalized via mean standard deviation normalization (e.g., using the mean and standard deviation computed over the training set). In some embodiments, in order to compensate for imbalance between land and water classes, the model uses weighted cross entropy loss function with weights 1 and 8 for land and water, respectively.

FIG. 1 illustrates an example operational environment in which the present disclosure may be practiced, according to embodiments of the present disclosure.

A social media service 110 is in communication with various user devices 120a-c (generally or collectively, user device 120) that send and consume social media posts hosted by the social media service 110. Several aerial image sources 130a-b (generally or collectively, aerial image sources 130), such as satellites, airplanes, helicopters, and the like provide images of a geographic area of interest, such as a flood zone, which may be provided directly to an aggregator service 140, or accessed by the aggregator service 140 from another hosting platform (e.g., via the internet). The aggregator service 140 collects aerial images and social media posts from the social media service 110 to collate and provide to a dispatch server 150. The dispatch server 150 (which may represent a computing device used by a police, fire, rescue, gendarme, National Guard, humanitarian, or emergency service provider) receives the collated data from the aggregator service 140, and may use the data to better inform or direct relief services using community reported data and accurate flood information mapped therewith.

Although illustrated with three user devices 120a-c accessing one social media service 110, and two aerial image source 130a-b capturing images of a geographic area of interest, the present disclosure contemplates that any number of such devices and services may be used in parallel or in series with the teachings provided herein.

Social media posts (e.g., "Tweets") that report useful information for humanitarian response and impact assessment as well as those posted within the area of interest are preferred. Since only a small percentage (1-2%) of social media posts contain exact geolocation information, the aggregator service 140 performs geotagging of social media posts that are without GPS-coordinates to increase the number of social media posts available for use with mapping. Furthermore, social media posts often contain noise and irrelevant content, therefore, the aggregator service 140 determines the relevancy and the type of information that the social media posts contain as part of the described analysis.

Figure 2:
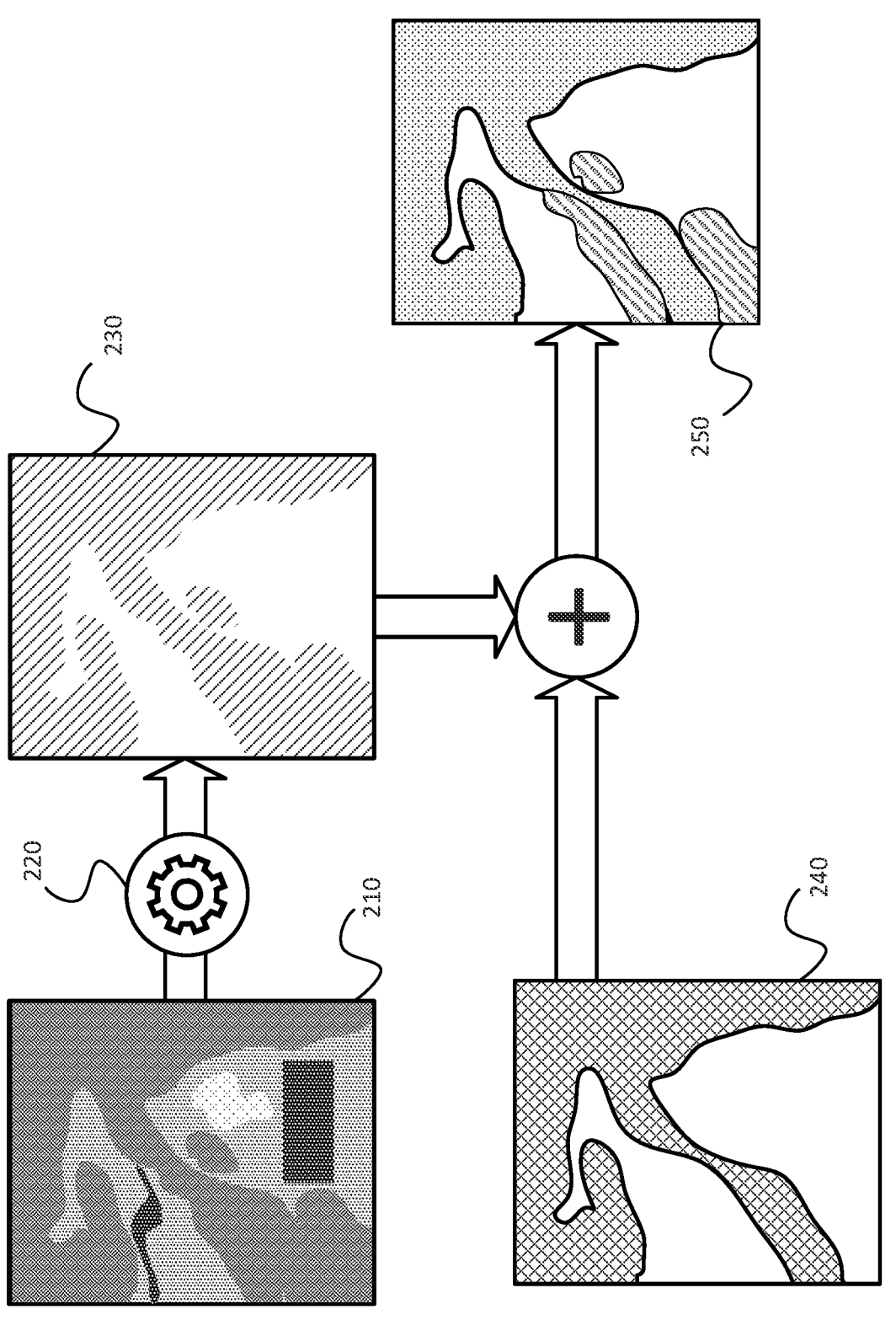
FIG. 2 illustrates a floodwater mapping process, according to embodiments of the present disclosure.

FIG. 2 illustrates a floodwater mapping process, according to embodiments of the present disclosure. An image 210 of a geographic area of interest may include many features, such as permanent water features, buildings, land, plants, etc. that obscure where floodwaters are in the image 210. In various embodiments, the image 210 is captured via synthetic aperture radar (SAR), which is unaffected by cloud cover and other weather conditions which may be present during a flood event. However, SAR data produces flood extents with limited accuracy in densely populated areas due to the increased amount of back scattering (e.g., from buildings).

A machine learning model 220 uses the image 210 to produce a water/non-water image 230 via a thresholding technique. The water/non-water image 230 applies a binary analysis to the geographic area shown in the image 210 that determines whether each sub-region (e.g., pixel, group of N pixels) in the image 210 is water or is non-water (e.g., via an associated color, texture, etc.).

However, in various situations, the thresholding technique has limited generalizability. For example, the detection of floodwaters in urban areas is a challenge as images can be unimodal or can have an inconspicuous bimodal histogram distribution, which makes determining an effect threshold to differentiate water and non-water regions difficult, and these difficulties can be compounded when the ratio of water to non-water regions in geographic area with varied terrain or in urbanized settings.

Accordingly, the machine learning model 220 used to generate the water/non-water image 230 is trained on a variety of data for generalized geography, such as aerial images, but is also augmented with data taken from localized image sources (e.g., persons in the affected geographic area) to provide more inputs and labeling for the inputs, which may be gleaned from the text of associated social media posts.

When applying the machine learning model 220 to identify floodwaters versus typical water distributions, a permanent water mask 240 is applied to the water/non-water image 230 to differentiate the various waters in the water/non-water image 230 to generate a flood image 250. In various embodiments, the permanent water mask 240 is generated by the machine learning model 220 from images of the geographic area of interest when no flooding is reported in the area. In some embodiments, the permanent water mask 240 may represent the geographic area at a high or low tide; a high water, low water, or typical water level for a river, reservoir, lake, or channel; or combinations thereof (e.g., a diversion channel at a high water level and a reservoir at a low water level to detect levy breaches when draining the reservoir via the diversion channel).

Therefore, the flood image 250 may be provided in a trinary format, with each sub-region (e.g., pixel, group of N pixels) in the flood image 250 indicating (via an associated color, texture, etc.) that it represents floodwater, non-flood water, or non-water.

Figure 3:
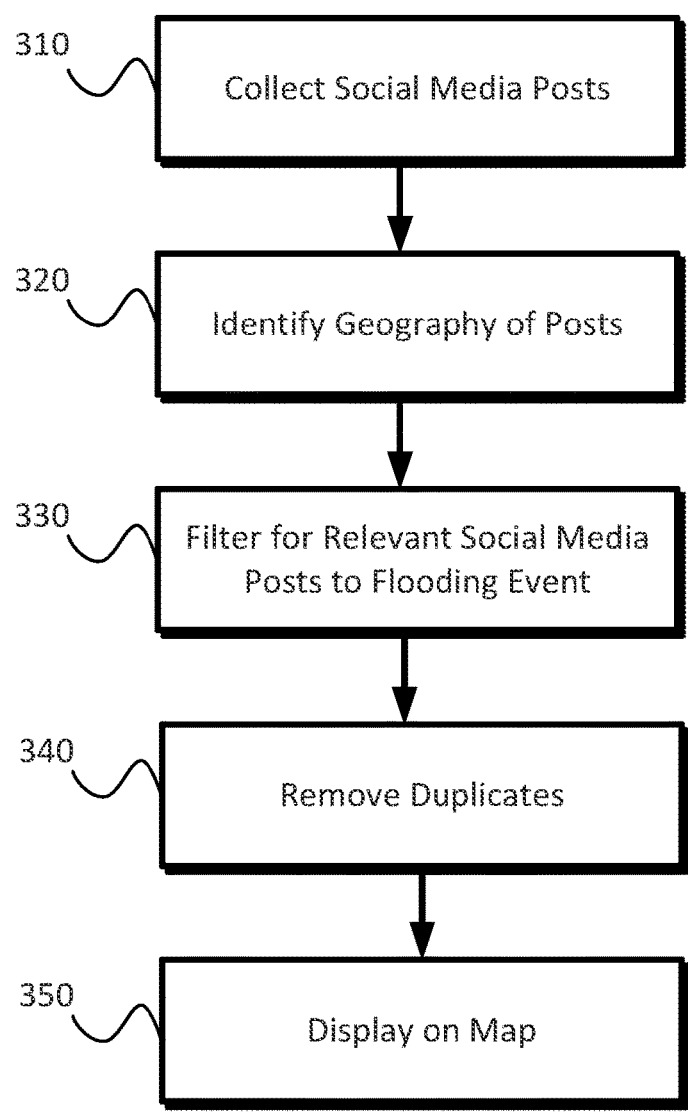
FIG. 3 is a flowchart of an example method for collating social media and mapping data, according to embodiments of the present disclosure.

FIG. 3 is a flowchart of an example method 300 for collating data, according to embodiments of the present disclosure. Method 300 begins at block 310, where the aggregation service collects social media posts to process. The aggregation services uses event-specific keywords or hashtags o gather social media posts related to an event of interest.

At block 320, the aggregation service identifies the geography of the social media posts. In various embodiments, the social media posts may be associated with GPS coordinates or Internet Protocol (IP) addresses that are geo-mapped, which can be used to identify the geography from which the social media post originated. In some embodiments, the aggregation service uses geotagging techniques to identify a geography for the posts. In some embodiments, the geotagging technique analyzes information from various metadata fields (e.g., geo-coordinates, user location, place, user profile description, and social media post text) and assigns city, county, state, and country information to social media posts.

At block 330, the aggregation service filters for relevant social media posts for a flooding event. In various embodiments, the aggregation service identifies social media posts that were posted from areas outside the region of interest and discards those posts. The social media posts and images, which were geotagged as being inside the areas of interest, are then processed through several text and image classification models.

For example, three deep learning text classifiers, namely disaster type detection (F1=0.93), informativeness (F1=0.93), and humanitarian (F1=0.76), can be used, each with an associated disaster type threshold, informativeness threshold, and humanitarian threshold, respectively. The first classifier predicts a disaster type of a social media post among several types. For example, when analyzing flood events, the first classifier keeps the social media posts predicted as "Flood type". The second classifier (e.g., "Informativeness"), determines if the tweet is informative or not. The third classifier determines the type of humanitarian information (e.g., damage report, urgent needs, etc.) an informative social media post contains.

In some embodiments, the images are classified using a disaster type prediction model to select the images classified as "heavy rainfall", "flooded", "tropical cyclone", and other classifications associated with the event under analysis. The filtering operations may therefor include filtering the social media platform for relevant social media posts, including the social media post, based on keywords and time data included in a corpus of social media posts including the relevant social media posts.

When a social media post satisfies all three of the associated disaster type threshold, informativeness threshold, and humanitarian threshold, the aggregator considers the post to be relevant to the event under analysis, but as distant observers may comment on a disaster, a geographic threshold may be applied so that posts outside of the geographic area of interest are ignored or otherwise discarded in various embodiments.

The present disclosure contemplates that different responders to disasters may value different data sets as relevant to the respective missions of those responders. Therefore, the person of ordinary skill in the relevant art is expected to be able to set a threshold and define examination criteria for each of the classifiers for disaster type, informativeness, and humanitarian nature without undue experimentation, and be able to select an appropriate model for analysis for these classifiers. For example, a fire department and a power company may both be interested in areas where electrical cables have fallen due to flooding, but the fire department may be more interested in active fires (which may be related to or unrelated to the downed cables) and the power company may be more interested in areas reporting power outages or continued power delivery (based on grid re-routing operations). Continuing with this example, ceterus paribus, a first social media post identifying a fire may be deemed relevant to the fire department and irrelevant to the power company, a second social media post indicating that no electrical power has been lost may be deemed irrelevant to the fire department and relevant to the power company, and a third social media post identifying where power cables have fallen may be deemed relevant to both the fire department and power company. Accordingly, the models and classifiers used by different entities, with different missions or goals in light of a disaster, may use classifiers and models tailored to their particular needs to identify what social media posts are relevant or not relevant.

At block 340, the aggregator service removes duplicate social media posts from consideration. In various embodiments, the aggregator also removes social media posts that quote, "re-tweet", follow, like, react-to, or otherwise incorporate an original social media post unless additional new data relevant to the flooding event are also included in the follow-up social media post.

At block 350, the aggregator services displays at least some of the relevant social media posts and images for co-display with a map or image of the affected geographic area of interest. In some embodiments, the aggregator services uses the remaining pertinent social media posts and images to overlay on floodwater segments predicted through the aerial imagery to offer enriched information for humanitarian decision making. In various embodiments, the aggregator may select a subset of the relevant posts or images for display with the map.

Figure 4:
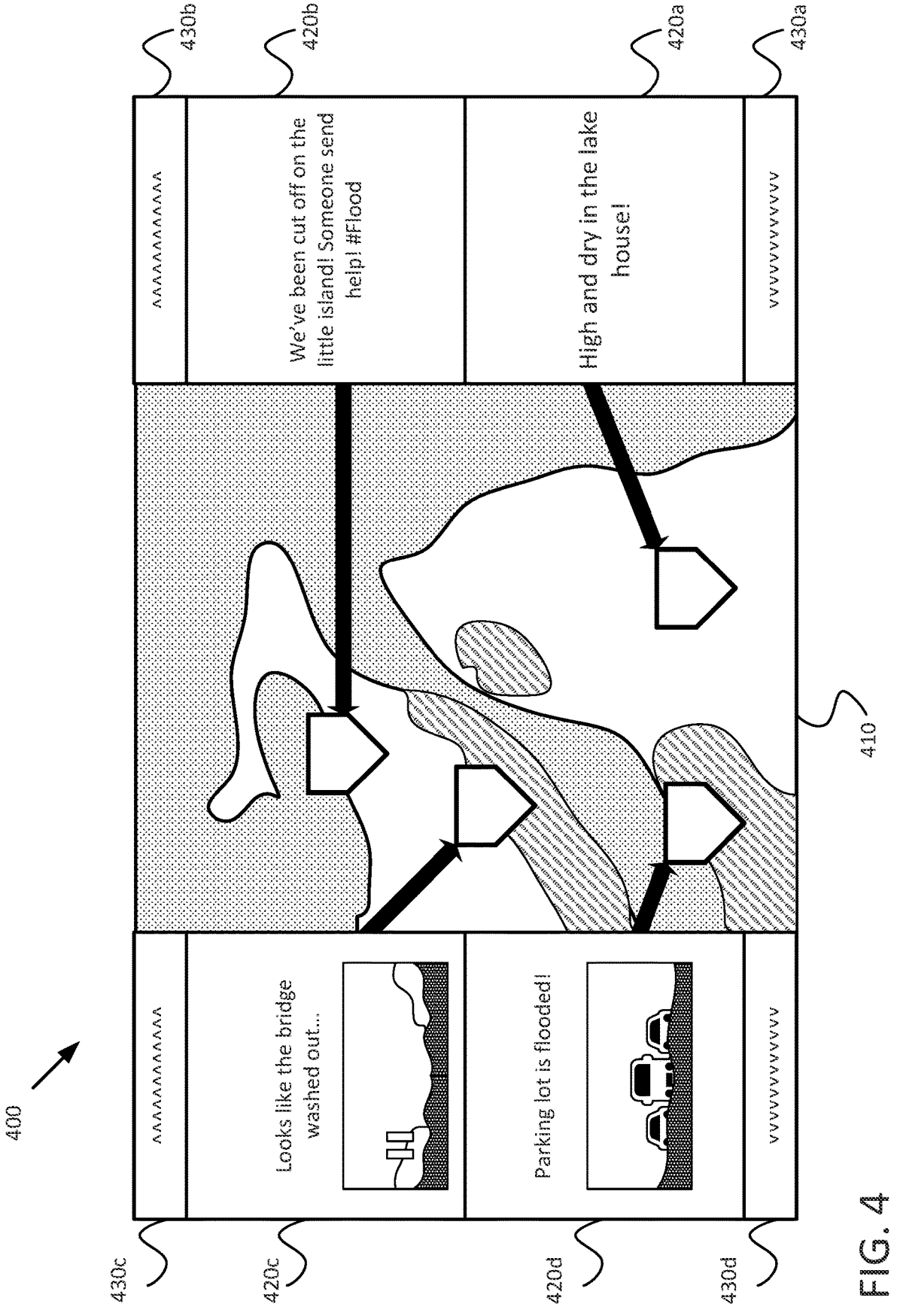
FIG. 4 illustrates an example user interface with social media and flood data overlay, as may be output for display for humanitarian decision making, according to embodiments of the present disclosure.

FIG. 4 illustrates an example user interface 400 with social media and flood data overlay, as may be output for display for humanitarian decision making, according to embodiments of the present disclosure. The user interface 400 includes a map 410, such as the flood image 250 discussed in relation to FIG. 2, that displays sub-regions of a geographic area of interest with various areas indicated as including floodwater, non-flood water, or non-water terrain (e.g., ground, buildings, etc.).

Overlaid onto the map 410 are various indicators for geo-located social media posts 420a-d (generally or collectively, social media posts 420) related to a flooding event and collected from the geographic area of interest. In various embodiments, the user interface displays the text and/or images included in these social media posts 420, and overlaying the image with the social media post includes positioning any photographs included in the social media posts 420 for display with the map where a subject of the photograph is located at the geographic area. For example, a user device may be geo-located at location X, but takes a photograph of a landmark, building, or other feature geo-located at location Y, and the overlay may position the social media post 420 (and associated indicator) at either location X or location Y.

The user interface 400 includes various navigation controls 430a-d (generally or collectively, navigation controls 430) that allow a user to cycle through the social media posts 420 that are co-displayed with the map 410, and request the display (and overlay) of additional or alternative social media posts 420 with the map 410.

In various embodiments, the social media posts 420 displayed (and overlaid) with the map 410 may be automatically refreshed by the aggregator service in addition to or instead of a user manually navigating the available pertinent social media posts 420. For example, the aggregator service may identify new social media posts 420 to add (or replace currently displayed social media posts 420), remove existing social media posts 420 from display (e.g., based on a timeout condition), or cycle navigation of available social media posts 420.

Figure 5:
FIG. 5 is a flowchart of an example method for isolating floodwater in aerial images, according to embodiments of the present disclosure.
Figure 5:
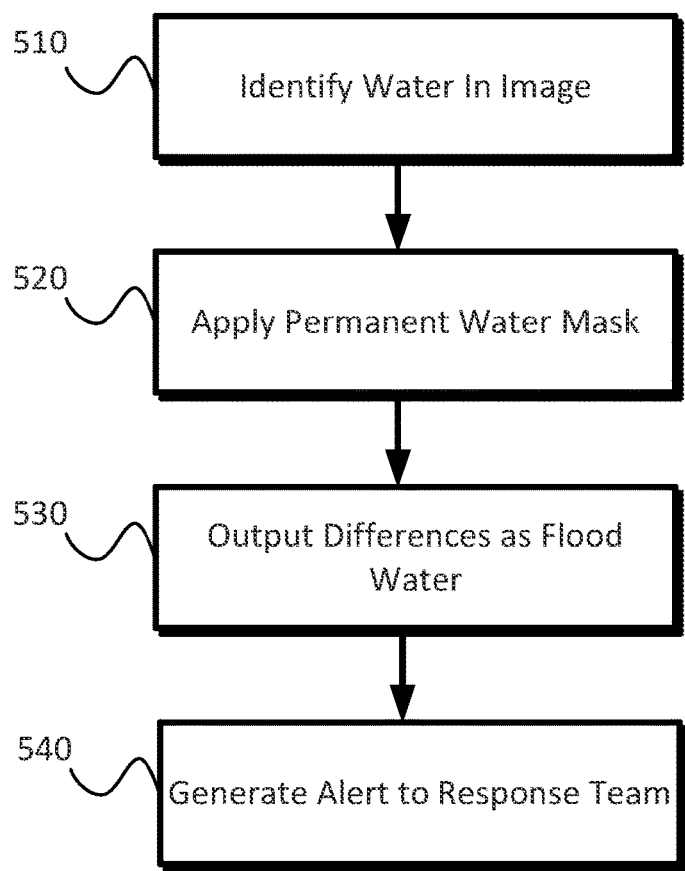

FIG. 5 is a flowchart of an example method 500 for isolating floodwater in aerial images, according to embodiments of the present disclosure. Method 500 begins a block 510, where an aggregator service receives an aerial image of a geographic area of interest, and identifies water in the image.

At block 520, the aggregator applies a permanent water mask to the areal image in which water was identified per block 510.

At block 530, the aggregator service outputs a difference between the permanent water mask and the aerial image as floodwater.

At block 540, the aggregator service generates and sends an alert to one or more dispatch servers. In various embodiments, the alert can include the map with floodwater identified thereon, and with various social media posts relevant to areas shown on the map and/or flooding conditions shown on the map, as is discussed in relation to method 300 described in relation to FIG. 3.

Figure 6:
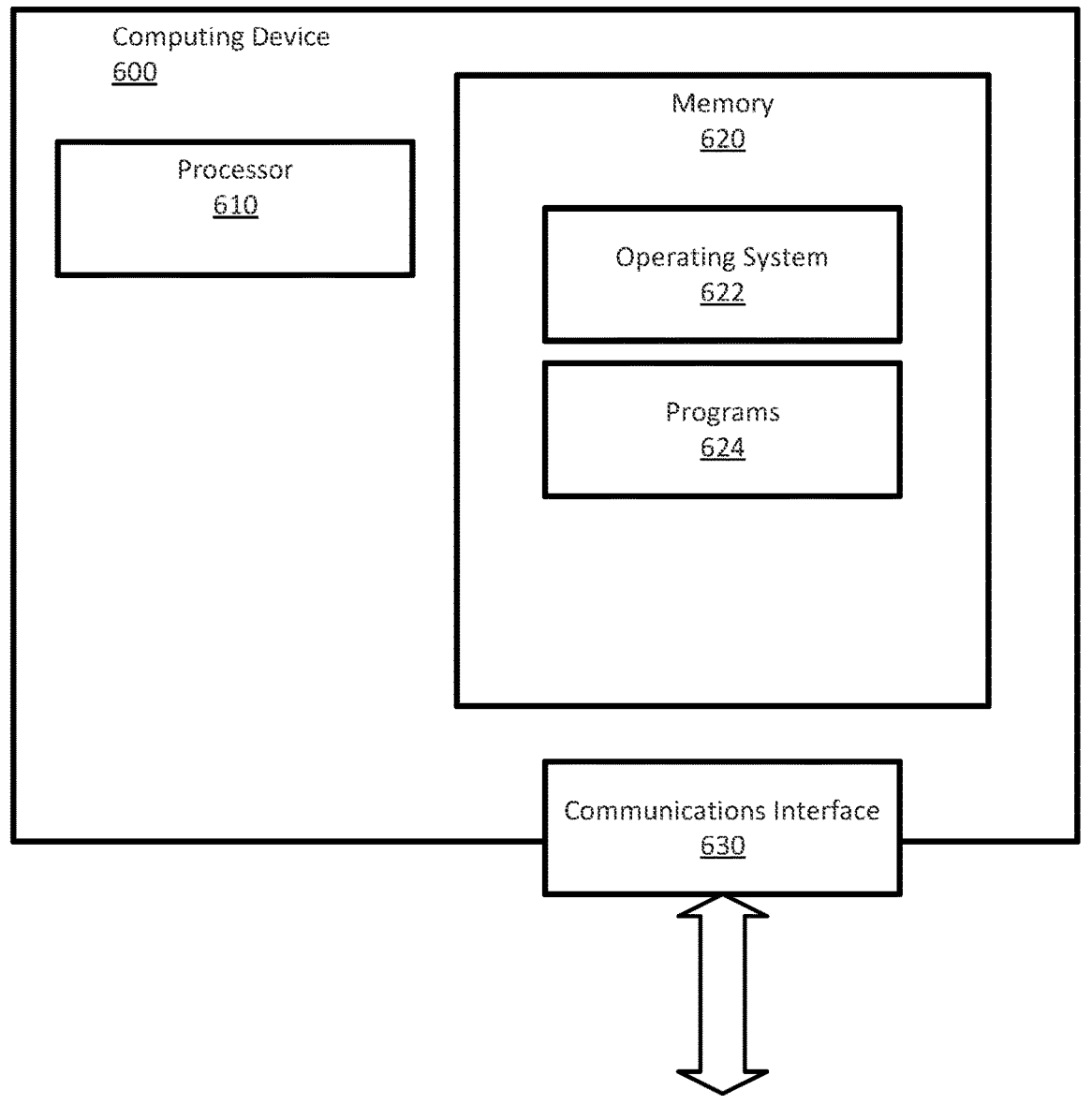
FIG. 6 illustrates a computer system, according to embodiments of the present disclosure.

FIG. 6 illustrates a computer system 600, such as may be used to perform method 300 described in relation to FIG. 3 and method 500 described in relation to FIG. 5, according to embodiments of the present disclosure. The computer system 600 may include at least one processor 610, a memory 620, and a communication interface 630. In various aspects, the physical components may offer virtualized versions thereof, such as when the computer system 600 is part of a cloud infrastructure providing virtual machines (VMs) to perform some or all of the tasks or operations described for the various devices in the present disclosure.

The processor 610 may be any processing unit capable of performing the operations and procedures described in the present disclosure. In various aspects, the processor 610 can represent a single processor, multiple processors, a processor with multiple cores, and combinations thereof. Additionally, the processor 610 may include various virtual processors used in a virtualization or cloud environment to handle client tasks.

The memory 620 is an apparatus that may be either volatile or non-volatile memory and may include RAM, flash, cache, disk drives, and other computer readable memory storage devices. Although shown as a single entity, the memory 620 may be divided into different memory storage elements such as RAM and one or more hard disk drives. Additionally, the memory 620 may include various virtual memories used in a virtualization or cloud environment to handle client tasks. As used herein, the memory 620 is an example of a device that includes computer-readable storage media, and is not to be interpreted as transmission media or signals per se.

As shown, the memory 620 includes various instructions that are executable by the processor 610 to provide an operating system 622 to manage various operations of the computer system 600 and one or more programs 624 to provide various features to users of the computer system 600, which include one or more of the features and operations described in the present disclosure. One of ordinary skill in the relevant art will recognize that different approaches can be taken in selecting or designing a program 624 to perform the operations described herein, including choice of programming language, the operating system 622 used by the computer system 600, and the architecture of the processor 610 and memory 620. Accordingly, the person of ordinary skill in the relevant art will be able to select or design an appropriate program 624 based on the details provided in the present disclosure.

The communication interface 630 facilitates communications between the computer system 600 and other devices, which may also be computer system 600 as described in relation to FIG. 6. In various aspects, the communication interface 630 includes antennas for wireless communications and various wired communication ports. The computer system 600 may also include or be in communication, via the communication interface 630, one or more input devices (e.g., a keyboard, mouse, pen, touch input device, etc.) and one or more output devices (e.g., a display, speakers, a printer, etc.).

Accordingly, the computer system 600 is an example of a system that includes a processor 610 and a memory 620 that includes instructions that (when executed by the processor 610) perform various aspects of the present disclosure. Similarly, the memory 620 is an apparatus that includes instructions that when executed by a processor 610 perform various aspects of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which, when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer-readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

The invention is claimed as follows:

1. A method, comprising:

identifying where floodwater is present in a current image of a location affected by a flooding event, wherein identifying where floodwater is present in the current image of the location affected by the flooding event comprises:

generating a permanent water mask identifying where permanent water is located at the location; and applying the permanent water mask to the current image to generate a differentiated image that separately indicates the floodwater from permanent water for the location;

identifying a social media post posted on a social media platform from the location and associated with the flooding event; and overlaying the differentiated image over the social media post, wherein the social media post includes a photograph of the location, wherein overlaying the differentiated image over the social media post includes positioning the photograph for display with the differentiated image where a subject of the photograph is located at the location.

2. The method of claim 1, wherein identifying the social media post posted on the social media platform from the location and associated with the flooding event further comprises identifying where the social media post was posted from based on at least one of:

a geolocation information included with the social media post; and a geolocation inference based on user location data, user profile description data, and text included in the social media post.

3. The method of claim 1, wherein identifying the social media post posted on the social media platform from the location and associated with the flooding event further comprises filtering the social media platform for relevant social media posts, including the social media post, based on keywords and time data included in a corpus of social media posts including the relevant social media posts.

4. The method of claim 1, wherein social media posts from a social media service are filtered to identify the social media post by removing any social media posts that fall below or outside of any of:

a disaster type threshold;

an informativeness threshold;

a humanitarian threshold; and a geographic threshold.

5. The method of claim 4, wherein the social media posts are filtered to remove duplicates and follow-on social media posts to original social media posts that do not also conform to the informativeness threshold.

6. A system, comprising:

a processor; and a memory, including instructions that when executed by the processor perform operations comprising:

identifying where floodwater is present in a current image of a location affected by a flooding event, wherein identifying where floodwater is present in the current image of the location affected by the flooding event comprises:

generating a permanent water mask identifying where permanent water is located at the location; and applying the permanent water mask to the current image to generate a differentiated image that separately indicates the floodwater from permanent water for the location;

identifying a social media post posted on a social media platform from the location and associated with the flooding event; and overlaying the differentiated image over the social media post, wherein the social media post includes a photograph of the location, wherein overlaying the differentiated image over the social media post includes positioning the photograph for display with the differentiated image where a subject of the photograph is located at the location.

7. The system of claim 6, wherein identifying the social media post posted on the social media platform from the location and associated with the flooding event further comprises identifying where the social media post was posted from based on at least one of:

geolocation information included with the social media post; and a geolocation inference based on user location data, user profile description data, and text included in the social media post.

8. The system of claim 6, wherein identifying the social media post posted on the social media platform from the location and associated with the flooding event further comprises filtering the social media platform for relevant social media posts, including the social media post, based on keywords and time data included in a corpus of social media posts including the relevant social media posts.

9. The system of claim 6, wherein social media posts from a social media service are filtered to identify the social media post by removing any social media posts that fall below or outside of any of:

a disaster type threshold;

an informativeness threshold;

a humanitarian threshold; and a geographic threshold.

10. The system of claim 9, wherein the social media posts are filtered to remove duplicates and follow-on social media posts to original social media posts that do not also conform to the informativeness threshold.

11. A memory including instructions that when executed by a processor perform operations comprising:

identifying where floodwater is present in a current image of a location affected by a flooding event, wherein identifying where floodwater is present in the current image of the location affected by the flooding event comprises:

generating a permanent water mask identifying where permanent water is located at the location; and applying the permanent water mask to the current image to generate a differentiated image that separately indicates the floodwater from permanent water for the location;

identifying a social media post posted on a social media platform from the location and associated with the flooding event; and overlaying the differentiated image over the social media post, wherein the social media post includes a photograph of the location, wherein overlaying the differentiated image over the social media post includes positioning the photograph for display with the differentiated image where a subject of the photograph is located at the location.

12. The memory of claim 11, wherein identifying the social media post posted on the social media platform from the location and associated with the flooding event further comprises identifying where the social media post was posted from based on at least one of:

geolocation information included with the social media post; and a geolocation inference based on user location data, user profile description data, and text included in the social media post.

13. The memory of claim 11, wherein identifying the social media post posted on the social media platform from the location and associated with the flooding event further comprises filtering the social media platform for relevant social media posts, including the social media post, based on keywords and time data included in a corpus of social media posts including the relevant social media posts.

14. The memory of claim 11, wherein social media posts from a social media service are filtered to identify the social media post by removing any social media posts that fall below or outside of any of:

a disaster type threshold;

an informativeness threshold;

a humanitarian threshold; and a geographic threshold.

* * * * *